(12) United States Patent
Palatov (10) Patent No.: US 11,699,817 B2
(45) Date of Patent: Jul. 11, 2023

(54) APPARATUS AND METHODS FOR REMOVABLE BATTERY MODULE WITH INTERNAL RELAY AND INTERNAL CONTROLLER

(71) Applicant: Dennis Palatov, Portland, OR (US)

(72) Inventor: Dennis Palatov, Portland, OR (US)

( * ) Notice: Subject to any disclaimer, the term of this patent is extended or adjusted under 35 U.S.C. 154(b) by 344 days.

(21) Appl. No.: 17/218,854

(22) Filed: Mar. 31, 2021

(65) Prior Publication Data

US 2022/0255148 A1 Aug. 11, 2022

Related U.S. Application Data

(63) Continuation-in-part of application No. 17/172,613, filed on Feb. 10, 2021, now Pat. No. 11,563,241.

(51) Int. Cl.
*H01M 10/04* (2006.01)
*H01M 10/42* (2006.01)

(52) U.S. Cl.
CPC .... *H01M 10/4257* (2013.01); *H01M 2220/20* (2013.01)

(58) Field of Classification Search
CPC ........... H01M 10/425; H01M 10/4257; H01M 10/4271; H01M 10/482; H01M 10/48; H01M 10/441; H01M 10/44; H01M 2010/4271; H01M 2010/4278; H01M 2220/20; B60R 16/0231; H04L 63/0876; H04L 63/0428; H04W 12/06; H04W 12/03
See application file for complete search history.

(56) References Cited

U.S. PATENT DOCUMENTS

| | | | |
|---|---|---|---|
| 8,051,285 B2 | 11/2011 | Shankar et al. | |
| 8,612,760 B2 | 12/2013 | Shankar et al. | |
| 2006/0156415 A1 | 7/2006 | Rubinstein et al. | |
| 2009/0146610 A1 | 6/2009 | Trigiani | |
| 2011/0270480 A1 | 11/2011 | Ishiibashi et al. | |
| 2013/0049471 A1* | 2/2013 | Oleynik | H02J 3/381 307/65 |
| 2015/0037656 A1* | 2/2015 | Noda | H01M 10/4264 429/149 |
| 2018/0046830 A1 | 2/2018 | Shankar et al. | |
| 2019/0288520 A1* | 9/2019 | Abdel-Monem | H02J 7/0014 |

* cited by examiner

*Primary Examiner* — Raymond Alejandro
(74) *Attorney, Agent, or Firm* — Mohr Intellectual Property Law Solutions, PC (57) ABSTRACT

A battery module is disclosed having a plurality of battery cells and internal relay controllably coupled to an internal module controller, said controller having a plurality of programmed states. Transitions between programmed states are disclosed responsive to a secure command message, and responsive to a monitored operating condition. Passive and active states are disclosed. A modular battery pack is disclosed consisting of a plurality of modules connected in parallel, which can be individually and independently activated and deactivated responsive to a secure command message. Methods are provided for authentication of command messages and for authentication of the command message source.

13 Claims, 7 Drawing Sheets

APPARATUS AND METHODS FOR REMOVABLE BATTERY MODULE WITH INTERNAL RELAY AND INTERNAL CONTROLLER

This application is a Continuation In Part of the co-pending application APPARATUS AND METHODS FOR REMOVABLE BATTERY MODULE WITH INTERNAL RELAY AND INTERNAL CONTROLLER, Ser. No. 17/172,613, filed on Feb. 10, 2021, which is incorporated herein by reference in its entirety. Additionally, this application is related to the co-pending application BATTERY MODULE WITH SERIES CONNECTED CELLS, INTERNAL RELAYS AND INTERNAL BATTERY MANAGEMENT SYSTEM, Ser. No. 17/141,125, filed on Jan. 4, 2021, which is incorporated herein by reference in its entirety.

BACKGROUND OF THE INVENTION

A vehicle battery module typically has significant monetary value associated with it, often ranging in the hundreds or thousands of dollars.

Battery modules commonly known in the art are constructed to be permanently installed in a sealed battery pack that is not easily accessed or serviced. Due to this fact, there is no need seen to additionally secure, track, or deter theft of such modules. The difficulty of physically accessing and removing the modules known in the art is commonly considered sufficient deterrent to theft.

In the referenced co-pending application, the applicant discloses novel apparatus and methods for battery packs comprising a plurality of removable high voltage modules that are individually enabled and disabled.

Due to the ease of module removal and the ability to use same module in different packs which is inherent in the novel removable high voltage modules taught by the applicant, the need arises to track, control the use of, and deter theft of the modules.

Additionally, with battery packs configured to accept new or replacement removable modules, it is desirable to ensure that any newly installed modules are compatible with the specific pack and the apparatus powered by the pack, and are safe to enable for operation.

What is needed in the arts of vehicle batteries is a removable battery module design, and methods of operation of same, that facilitate control over the use of the modules, deter unauthorized or incompatible use, and facilitate both tracking of the modules in ordinary use and assist the recovery of any modules that are stolen.

SUMMARY OF THE INVENTION

A first objective of the present invention is to provide a removable high voltage battery module having a means to check whether an attempted use of the module is authorized, and to deter unauthorized use.

A second objective of the present invention is to provide a battery module design, battery pack design, infrastructure design and methods that facilitate tracking of the ordinary use of the module.

A third objective of the present invention is to provide a battery module design, battery pack design, infrastructure design and methods that assist the location and recovery of a module that has been stolen.

To achieve the objectives, a battery module of the present invention is assigned at least a unique identifier (ID) at the time of manufacture. In embodiments wherein modules have serviceable components, a first unique ID may be associated with non-serviceable components, and one or more serviceable components may be assigned additional unique IDs.

The module controller of the present invention contained within the module is provided with the means of secure communication with a pack controller.

A pack controller of the present invention is likewise assigned a unique ID at the time of manufacture, and is likewise provided with the means of secure communication with a module controller contained within one or more removable modules.

A pack controller is further provided with a means of securely communicating with an authentication controller.

Distinct programmed states of a removable battery module are disclosed, each of said states having a distinct set of module functions that are enabled, and may further have a distinct set of module functions that are disabled. In some states, certain module functions may be limited or restricted. In some states, unauthorized use of module is deterred.

Methods are provided for transitioning a module between distinct programmed states. Some of the transitions may be effected responsive to secure communications with an authentication controller.

Additional methods are provided for communicating module data from pack controller to data center, checking whether the specific module has been reported as stolen, reporting a module as stolen, and reporting a module as recovered.

BRIEF DESCRIPTION OF THE DRAWINGS

The present invention is described herein with reference to the following drawings. The components in the drawings are not necessarily to scale relative to each other. Like reference numerals designate corresponding parts throughout the several views.

DETAILED DESCRIPTION

Figure 1:
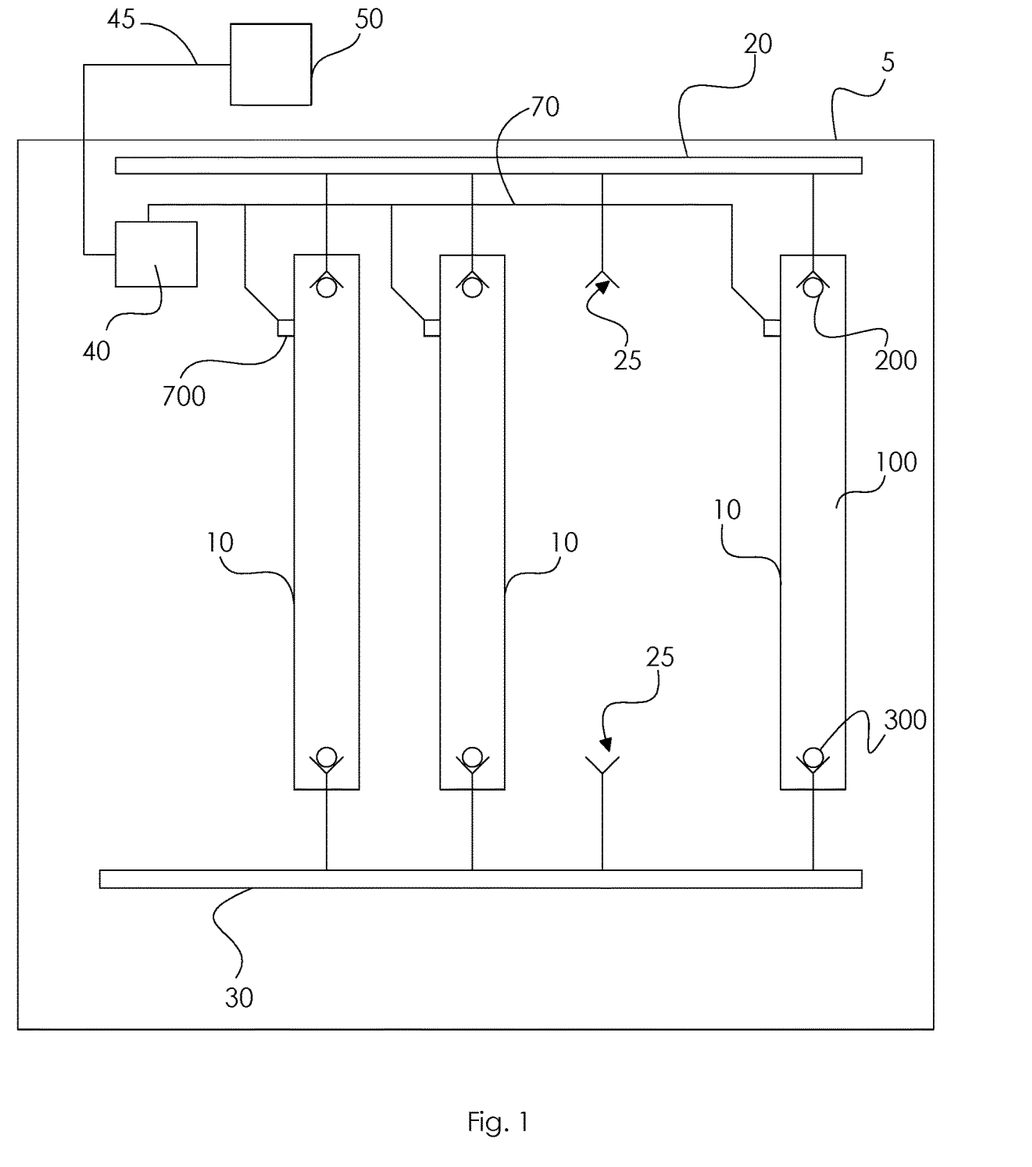
FIG. 1 is a diagram representation of a modular battery pack of the present invention communicatively coupled to an authentication controller.

An embodiment of a modular battery pack 5 of the present invention having a plurality of removable battery modules 10, and being communicatively coupled to authentication controller 50, is diagrammatically illustrated in FIG. 1. The illustrated embodiment is not limiting. Other embodiments shall become apparent to those skilled in the art based on the disclosures made herein.

The disclosed systems and methods for operating modular battery packs 5 having removable battery modules 10 will become better understood through review of the following detailed description in conjunction with the figures. The detailed description and figures provide examples of the various inventions described herein. Those skilled in the art will understand that the disclosed examples may be varied, modified, and altered without departing from the scope of the inventions described herein. Many variations are contemplated for different applications and design considerations, however, for the sake of brevity, each and every contemplated variation is not individually described in the following detailed description.

Throughout the following detailed description, a variety of examples for systems and methods for the battery pack 5 and battery modules 10 are provided. Related features in the examples may be identical, similar, or dissimilar in different examples. For the sake of brevity, related features will not be redundantly explained in each example. Instead, the use of related feature names will cue the reader that the feature with a related feature name may be similar to the related feature in an example explained previously. Features specific to a given example will be described in that particular example. The reader should understand that a given feature need not be the same or similar to the specific portrayal of a related feature in any given figure or example.

The following definitions apply herein, unless otherwise indicated.

"Substantially" means to be more-or-less conforming to the particular dimension, range, shape, concept, or other aspect modified by the term, such that a feature or component need not conform exactly. For example, a "substantially cylindrical" object means that the object resembles a cylinder, but may have one or more deviations from a true cylinder.

"Comprising," "including," and "having" (and conjugations thereof) are used interchangeably to mean including but not necessarily limited to, and are open-ended terms not intended to exclude additional, elements or method steps not expressly recited.

Terms such as "first", "second", and "third" are used to distinguish or identify various members of a group, or the like, and are not intended to denote a serial, chronological, or numerical limitation.

"Coupled" means connected, either permanently or releasably, whether directly or indirectly through intervening components.

"Electrically coupled", "electrically connected" means circuit elements connected in a way to enable conduction of electrical current between the elements.

"Connector", "electrical connector" means a structure or device to electrically couple circuit elements in a way that is releasable.

"Interconnect", "electrical interconnect" means a structure or device to electrically couple circuit elements in a way that is not releasable.

"Communicatively coupled" means that an electronic device is in communication with another electronic device for the purpose of transmission of electronic messages, either wirelessly or with a connector, whether directly or indirectly through a communication network.

"Controllably coupled" means that an electronic device controls operation of another electronic device.

"PCBA" means a printed circuit board assembly, comprising a non-conductive substrate, one or more etched electrically conductive traces for electrically coupling circuit elements, and one or more electrical circuit elements which may be integrated circuits, relays, cell interconnects and the like.

"Cell", "battery cell" refers to a single anode and cathode separated by electrolyte used to produce a voltage and current. A battery module of the present invention comprises one or more groups of cells connected in series within the group. Cells may be cylindrical, prismatic, pouch, or any other type. Cells may be of Lithium-Ion or any other chemical type.

"Command message", "command" is an electronic message sent from a first electronic circuit to a second electronic circuit to initiate an action or state change by said second circuit. In many embodiments, a command message will be a secure message transmitted by means of secure communication.

"Status message" is an electronic message sent by a second electronic circuit to a first electronic circuit, said message containing information pertaining to state or action status of said second circuit, or another circuit.

"Secure communication", "secure message" means communication by means of an encrypted message, or any other type of message that deters reading, modification or falsification by unauthorized parties or devices. Any type of known encryption may be utilized, including public key, private key, digital signing and the like. Different types of secure communication may be utilized within an embodiment for different types of messages. Encryption and decryption of messages may be carried out in software and may be carried out with hardware assist in controllers so equipped. Secure communication is well known in the arts of electronic devices and is therefore not described in detail herein.

"Unique ID" means a numeric or alphanumeric value that is generated to be unique and assigned to a specific physical device such as an electronic circuit, electronic assembly, or a machine which may be a vehicle. Generation and assignment of unique IDs is well known in the arts. Registration of unique IDs in a database is also well known. For vehicles, the unique ID typically takes the form of a Vehicle Identification Number (VIN). Various types of electronic circuits are known which have unique ID assigned and imbedded in them at the time of manufacture, such as controllers, processing units, networking controllers and the like. Assigning a unique ID to an electronic device is well known in the arts of electronic device design and is therefore not described in detail herein.

"Vehicle Identification Number", "VIN" means a unique ID that is officially assigned and registered to a vehicle by the vehicle manufacturer. A VIN is customarily recorded in a database by a Government agency.

"Product Identification Number", "PIN" means a unique ID that is assigned to apparatus comprising a battery pack by the manufacturer of the apparatus, when such apparatus is not a vehicle. Examples of apparatus having a PIN are battery chargers, in-home and commercial energy storage units, backup power supplies and the like. A PIN may be recorded in a database by the apparatus manufacturer, industry agency, or Government agency.

"Module Identification Number", "MIN" means a unique ID that is assigned to a battery module by the module manufacturer. A MIN may be recorded in a database by the module manufacturer, industry agency, or Government agency.

"Vehicle Control Unit", "VCU" means an electronic controller which is controllably coupled to and controls the operation of vehicle electronic and electromechanical systems responsive to operator inputs.

"Authentication controller" means an electronic device having a means to authenticate whether an attempted use of a battery pack or a battery module is authorized. For an electronic device that is a VCU, such means may include being communicatively coupled to a vehicle key. For a controller connected to the Internet or another network, such means may include being communicatively coupled to a data center having a database of registered PINs or MINs. Other authentication means may include sensing operator biometrics, entry of a passcode by the operator, or any other known authentication means.

"Battery module", "module" means an electronic device comprising a plurality of cells connected in series, a positive and a negative terminal, relays to electrically couple the plurality of cells to each of the positive and negative terminals, and means of controllably coupling the relays to a controller. In some embodiments the means of controllably coupling the relays to a controller is a Battery Management System (BMS) controller capable of secure communication.

"Battery pack", "pack" means electrical, mechanical and electronic apparatus configured to releasably receive a plurality of battery modules, electrically couple the received modules in parallel among like modules, electrically couple the modules collectively to an external electrical load or electrical source, and controllably couple the modules collectively to a controller. A battery pack may be configured to only charge the received modules, only discharge the received modules, or both.

"Battery module state", "module state", "state" means a distinct programmed configuration of a battery module in which some specific functionality of the module may be enabled, some specific functionality of the module may be disabled, and some specific functionality of the module may be limited or restricted. For example, charging and discharging current limits may be set to different specific values in different states, and may be set to zero in some states. In the context of the present invention and the descriptions presented herein, a module state is implemented by means of execution of a control program in the module controller to control one or more relays responsive to one or more controlling parameters which are stored in nonvolatile memory, and further responsive to monitored operating conditions such as current, voltage and temperature measurements. Monitoring of operating conditions is accomplished by means of measurement circuits and is well known in the arts of electronic circuit design. Storing parameters in nonvolatile memory is known in the art of controllers and is not described in detail herein. Transitions between states are accomplished programmatically responsive to command messages received by module controller, and may further be responsive to monitored operating conditions. Some state transitions may be conditional on successful authentication.

"Passive state" means a battery module state in which all relays are disabled, and which requires the reception of a valid command message from an authorized pack controller in order to transition to an active state. Transition from a first passive state to another passive state may be responsive to monitored operating conditions or responsive to a command and may require authentication.

"Active state" means a battery module state in which one or more relays are under active control of the module controller responsive to monitored operating conditions such as measured current, measured voltage, measured temperature, activated duration time period expiration, and the like. Transitions between active states, of from active states to passive states, may be responsive to monitored operating conditions or command and may require authentication.

"Charging current" means electrical current that flows into the module from an external electrical source such as a charger, adding to the electrical energy stored in the module.

"Discharging current" means electrical current that flows from the module to an external electrical load, subtracting from the electrical energy stored in the module.

FIG. 1 is a representative diagram showing battery pack 5 having a pack controller 40 which is communicatively coupled to an authentication controller 50 by means of a communications link 45. Each pack controller 40 is assigned a unique ID at the time of manufacture. For embodiments of battery packs 5 which are installed in a vehicle, the authentication controller 50 may be a Vehicle Control Unit (VCU) being communicatively coupled to a vehicle key and communications link 45 may be Controller Area Network (CAN) bus or similar. For embodiments of battery packs 5 which are installed in stationary structures, such as charging stations or in-home energy storage units, the authentication controller 50 may be a remotely located data center having a database, and communications link 45 may be the Internet communicatively coupling the pack controllers 40 to the authentication controller 50. In some embodiments, the authentication controller 50 may be a cellular phone, which may further be communicatively coupled to an Internet database, and communications link 45 may be wireless.

A plurality of removable modules 10 are illustrated. Also illustrated are vacant sockets 25 to receive an additional module that is not illustrated. The illustration is simplified for clarity and is not numerically or otherwise limiting.

Pack controller 40 is communicatively coupled to control bus connectors 700 of modules 10 via control bus 70. The pack controller 40 is the source of commands that are received by each of controllers 900 comprised within modules 10.

The positive terminals 200 and negative terminals 300 of modules 10 are electrically coupled to positive power bus 20 and negative power bus 30 by means of sockets 25. External electrical load such as an inverter, or an external electrical source such as a charger, is customarily electrically coupled to power bus 20 and power bus 30. Such coupling of a battery pack power bus to an electrical load or source is well known in the art and is omitted from the illustration for brevity. Some embodiments of battery pack 5 may further employ power distribution devices coupled to power busses such as fuses, relays, isolation monitoring circuits, current sensors and the like. Such devices being coupled to a power bus of a battery pack are well known in the art and are not illustrated. In some embodiments, the internal relays and circuits of the modules of the present invention comprised in a pack will render additional pack power distribution devices unnecessary, resulting in a reduction in pack cost and complexity.

Figure 2:
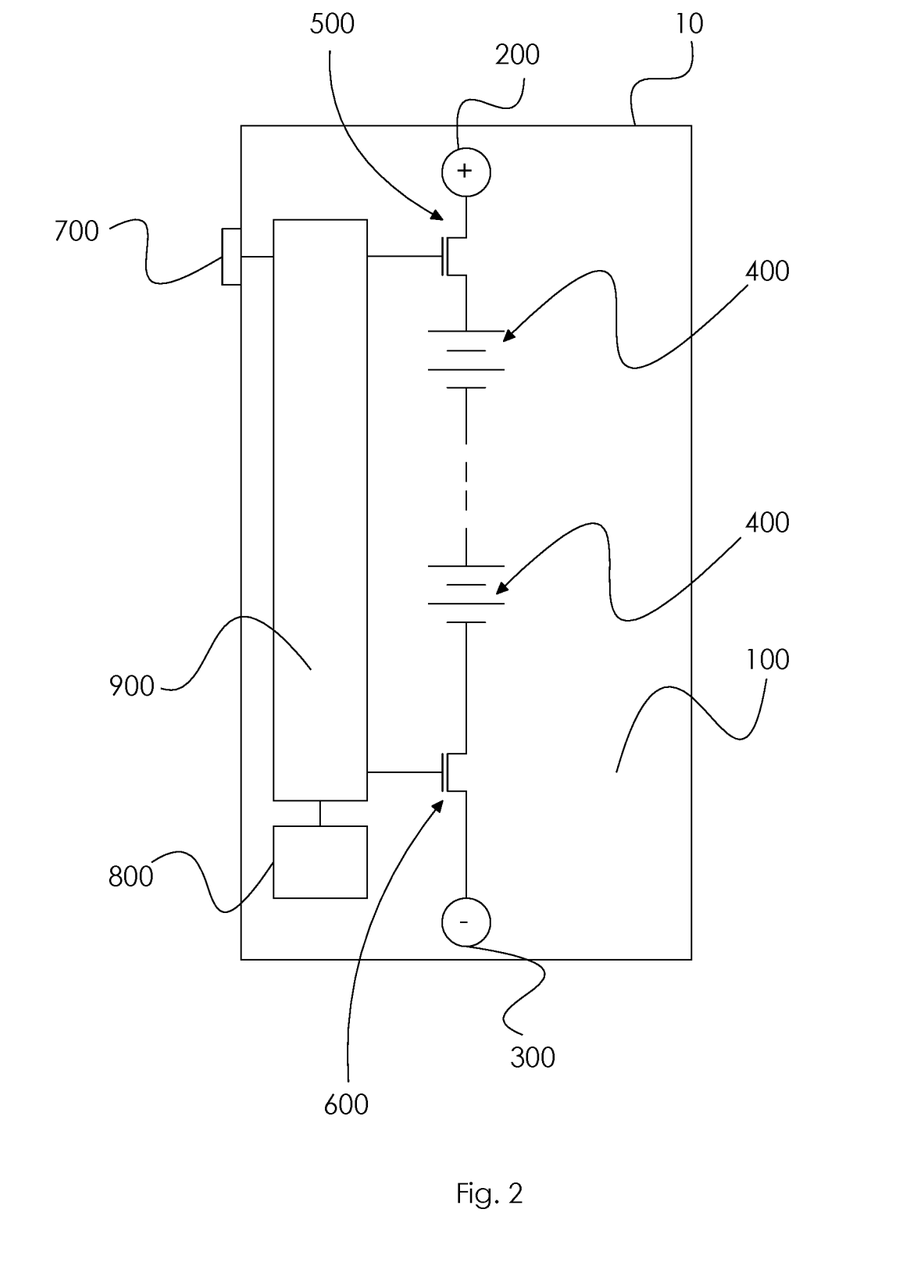
FIG. 2 diagrammatically illustrates a battery module of the present invention.

FIG. 2 is a conceptual illustration of the features of a battery module 10 of the present invention. The enclosure 100 is illustrated containing a plurality of cells 400, a positive terminal 200 being electrically coupled to said plurality of cells by relay 500, and negative terminal 300 being electrically coupled to said plurality of cells by relay 600. Relays 500 and 600 are controllably coupled to module controller 900, which is further communicatively coupled to control bus connector 700. Some embodiments of the present invention, which are not illustrated, may have only one relay to control the connection of the plurality of cells to only one of the terminals, while the other of the terminals is connected to the plurality of cells either directly or through a fusible link.

An optional operator interface 800 is diagrammatically illustrated being communicatively coupled to module controller 900. The operator interface may comprise visual indicators, pushbuttons, switches, audible indicators and the like, for the purpose of indicating module state and obtaining operator input. Operator interfaces are well known in the art and are not detailed herein. Some embodiments may omit an operator interface.

In some embodiments the operator interface 800 may not be physically comprised within the module, and may be a cellular phone configured with an operator interface app, said cellular phone being communicatively coupled to module controller 900 by a wireless link such as Bluetooth.

Figure 4:
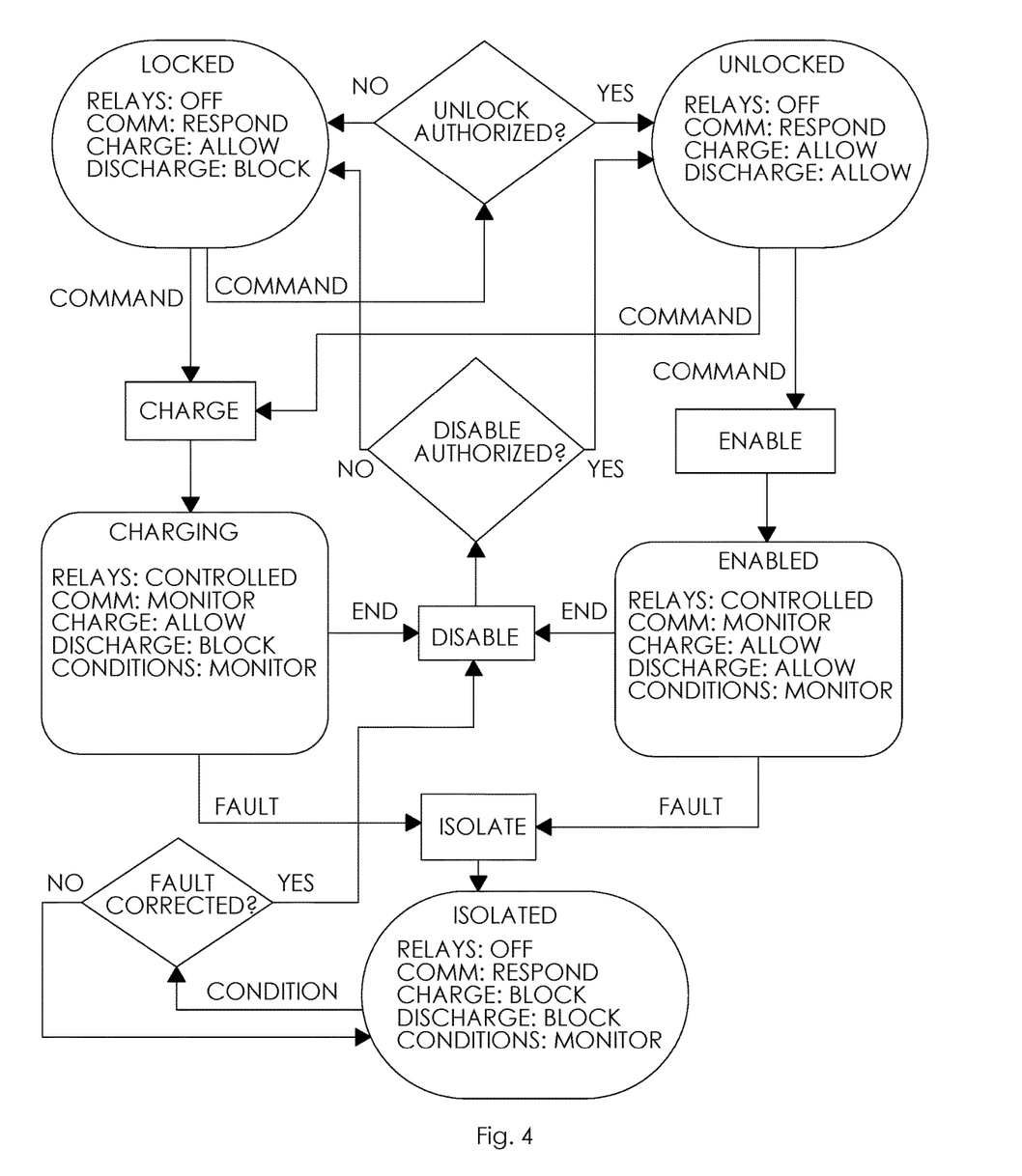
FIG. 4 is a state diagram showing the programmed states of a module of the present invention and the transitions between said states.

In embodiments having an operator interface, a module controller in a FAULT or LOCKED state (as illustrated in FIG. 4 and further described below) may periodically report its state by means of said interface. For example, a visual indication may be shown at predetermined intervals, such as an illuminated Light Emitting Diode (LED). In embodiments having a wireless link to the operator interface, the periodic indication may be by means of a wireless transmission.

Figure 3:
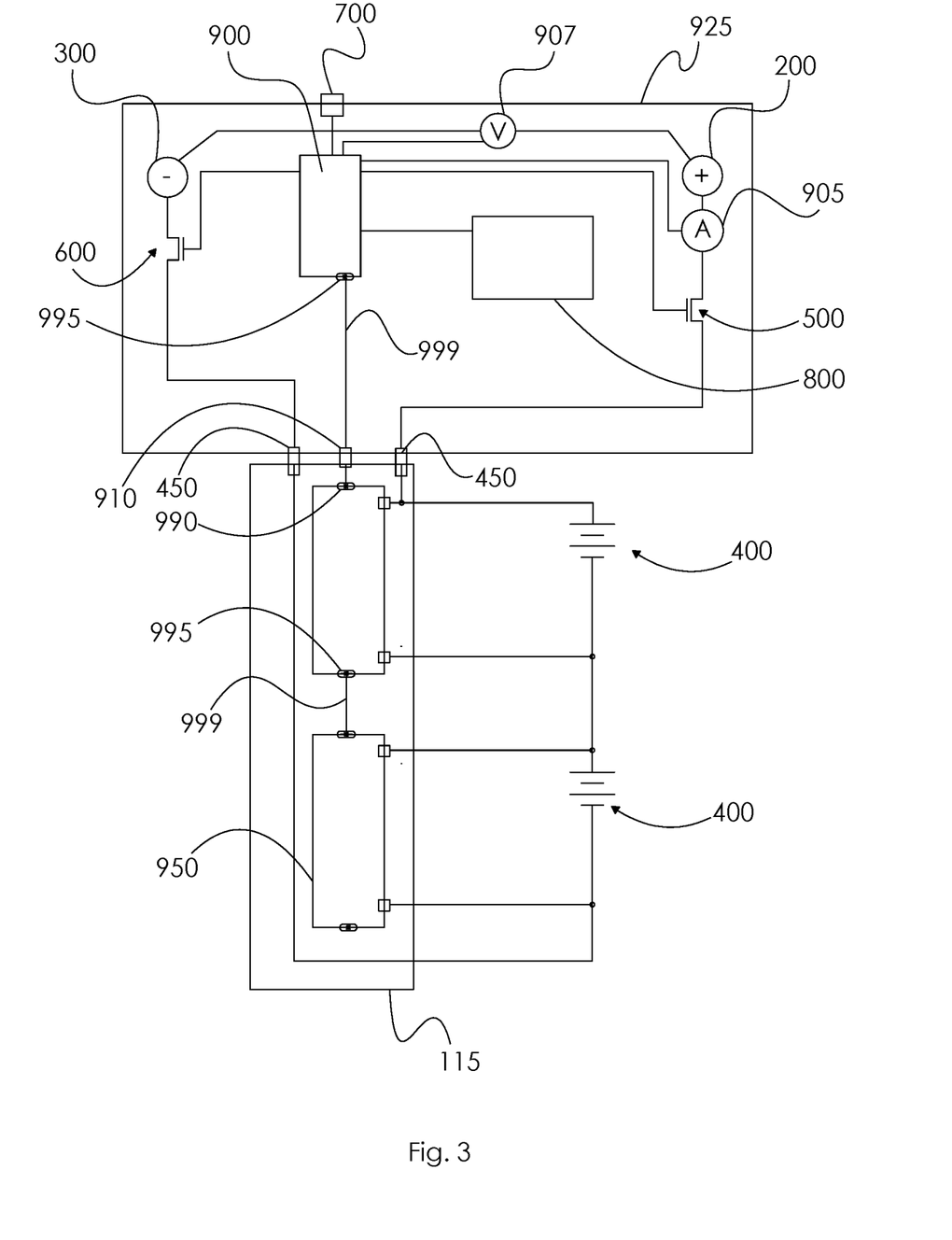
FIG. 3 shows an external interface PCBA comprising a module controller and associated circuitry, a cell monitoring PCBA having a plurality of cell monitoring and conditioning circuits, said circuits being coupled to a plurality of cells.

One embodiment of the electronic apparatus of a module 10 is illustrated in further detail in FIG. 3, comprising an external PCBA 925 and a module conditioning and monitoring PCBA 115. In other embodiments, the illustrated circuitry may be combined on a single PCBA. In still other embodiments, the circuitry may be distributed over a plurality of distinct assemblies, some of which may be flexible.

The external interface PCBA 925 is shown comprising positive terminal 200, negative terminal 300, battery module controller 900, control bus connector 700, connectors 450 for electrically coupling to cells 400, and communication connector 910 for communicatively coupling to PCBA 115 and the cell monitoring and conditioning circuits 950 comprised therein.

An optional operator interface 800 is illustrated being communicatively coupled to the module controller 900, however some embodiments may omit an operator interface.

A current sensor 905 is illustrated as being coupled to the positive terminal 200, other embodiments may couple a current sensor to negative terminal 300. A voltage measurement circuit 907 is shown connected to terminals 200 and 300. In some embodiments, voltage measurement circuit 907 may be internal to module controller 900. Relays 500 and 600 are also shown. Other embodiments may have additional relays to connect multiple groups of series-connected cells in series or in parallel with each other. Such configurations are disclosed in the referenced application not illustrated herein for brevity. Some additional embodiments may omit one of the relays 500 and 600 without departing from the scope of the present invention and are likewise not illustrated herein.

In some embodiments, relay 500 may be of a first type, and relay 600 may be of a second type. For example if the first type of relay is electromechanical it provides complete galvanic isolation when open. However, electromechanical relays are relatively slow to respond. If the second type of relay is solid state, which responds to control input very quickly, it can be used to rapidly open the circuit if current sensor 905 detects excessive current. Some solid state relays may not provide complete galvanic isolation. By utilizing two distinct types of relays, a PCBA 925 can provide both full galvanic isolation and fast response to variations in measured current.

In some embodiments, the current sensor 905 may be of Hall Effect type, and may sense both magnitude and direction of current.

Circuits 950 are communicatively coupled to each other and to module controller 900 by means of uplink ports 990 and downlink ports 995, connected by communication links 999. Details of the circuits 950 are disclosed in the referenced application and are not illustrated here. Pertinent to the methods disclosed herein, circuits 950 measure the individual voltages of cells 400 and communicate the results of the measurements to module controller 900 by means and methods disclosed in the referenced application.

A control bus port 700 is provided for communication with an external controller such as pack controller, Vehicle Controller Unit (VCU), charger and the like.

In some embodiments, terminals 200 and 300, and control bus port 700, may be combined into a single physical connector.

Additional low voltage power connector may be provided in some embodiments to power the module controller 900 and relays 500 and 600 independently of the cells 400, and may further be combined into a single physical connector with the terminals and the control bus port.

FIG. 4 is a representative state diagram showing programmed states of an embodiment of a battery module of the present invention, the representative functionality associated with each state, and the transitions between the states. FIG. 4 is illustrative and not limiting.

A battery module is configured to have distinct programmed states by means of storing an executable program in non-volatile memory associated with module controller 900, and then executing said program. Such programs, means of storing them in non-volatile memory, and means of securely updating them via a communications link are well known in the art of controllers and are not detailed herein. Non-volatile memory for storing an executable program is customarily provided in controllers known in the art.

The illustrated states are of two types: passive states, which include LOCKED, UNLOCKED and ISOLATED, and active states which include CHARGING and ENABLED. The names of the states used herein are descriptive for the purpose of distinguishing between the illustrated states and are not limiting.

In active states, one or more relays are actively controlled by module controller 900 responsive to monitored operating conditions and further responsive to any programmed parameters associated with the specific state. Control bus port 700 is monitored for reception of valid command messages by the module controller 900. Time since reception of the most recent valid command message is compared to a predetermined timeout period. This functionality is indicated in the diagram of FIG. 4 by the COMM: MONITOR legend. Monitored operating conditions may include magnitude and direction of current measured by current sensor 905, terminal voltage measured by voltage sensor 907, individual cell temperature and voltage reported by each of circuits 950, and the like.

In passive states, all relays are turned off and the plurality of internal cells 400 are electrically isolated from the terminals 200 and 300. The module controller 900 may be active, in a low power condition or powered down.

Transition from one state to another state may be initiated by the module controller 900 responsive to a valid command from an authorized pack controller 40 (FIG. 1). An authorized pack controller 40 has a unique ID which is on a list of authorized pack controllers maintained by the module controller 900. In embodiments wherein multiple lists of authorized controllers are maintained, each list may correspond to a specific set of state transitions the listed pack controllers 40 are authorized to command, which may be distinct from the set of state transitions that controllers listed on another list are authorized to command.

In some embodiments a list of authorized pack controllers may contain additional data associated with each authorized pack controller 40, which may be used to further authorize or restrict state transitions that may be commanded by the pack controller 40. A list may be maintained in non-volatile memory comprised in the module controller 900, or another circuit comprised within the module 10.

In some embodiments, a pack controller 40 may further maintain a list of module controller IDs that have been connected to the pack. Such a list may further contain data on module usage, and whether a module has been removed without authorization.

Both pack controller lists maintained by module controller and module controller lists maintained by pack controller, along with any associated data, may be periodically uploaded to a database, which may be communicatively coupled to an authentication controller 50 (FIG. 1).

The module controller 900 (FIG. 2) may transition from a passive state to another passive state responsive to a monitored condition. From a passive state, the module controller 900 may only transition to an active state responsive to a valid command from an authorized pack controller 40.

A module controller 900 may transition from an active state to another active state responsive to a monitored condition or a valid command from an authorized pack controller 40.

A module controller 900 may transition from an active state to a passive state responsive to an end condition, a fault condition, or a command.

In some embodiments the illustrated end condition may be defined as receiving a valid disable command, reaching a predetermined module voltage threshold, reaching a predetermined module current threshold, reaching a predetermined module temperature threshold, or any other programmed combination of monitored operating conditions. In the illustrated embodiment, an end condition is indicative of ordinary use, does not require corrective action and does not preclude further ordinary use of the module.

Upon reaching an end condition, the module is disabled by transitioning to a passive state. Authentication steps may be attempted during the transition to determine whether the module should be placed in a specific passive state which may allow or restrict certain subsequent state transitions without further authentication.

In some embodiments the illustrated fault condition may be defined as crossing a predetermined module voltage threshold, exceeding a predetermined module current threshold, detecting unauthorized discharge current, exceeding a predetermined module temperature threshold, exceeding a timeout period without receiving a new valid command, or any other programmed combination of monitored operating conditions. In the illustrated embodiment a fault condition is indicative of faulty, unauthorized or dangerous use that may require corrective action and precludes further ordinary use of the module 10 (FIG. 1) until the condition is corrected.

For example, unauthorized physical removal of a module from a pack without authenticating such removal would result in the module transitioning to a LOCKED state. This, in the illustrated embodiment, would allow the module to be charged but would require further successful authentication before the module can transition to an ENABLED state.

FIG. 4 further shows a list of representative module functionality that is associated with each illustrated module state.

The illustrated embodiment allows charging of a module that is in a LOCKED state in order that a module may be maintained in a safe state of charge even in the absence of authentication. In other embodiments, the transition to CHARGING state may require authentication to further deter unauthorized use or to ensure compatibility of the module with the charging apparatus. This may be particularly desirable for modules that are capable of being configured to operate at more than one voltage, as disclosed in the referenced application.

Some embodiments may have a plurality of active states, each having distinct programmed parameters. For example, embodiments may have a plurality of CHARGING states having distinct charging current limits associated with each state, which may be responsive to measured conditions such as voltage and temperature, and may further be responsive to authentication.

Some embodiments may have a plurality of ENABLED states having distinct charging current limits and discharging current limits associated with each state, which may be responsive to measured conditions such as voltage and temperature, and may further be responsive to authentication.

Embodiments may have a plurality of passive states, including states having an associated list of known pack controllers 40 (FIG. 1) that are authorized to command a transition to another state. Such authorized pack controller lists may be stored in nonvolatile memory comprised in the module controller 900 or another electronic circuit comprised in PCBA 925 or PCBA 115, and may further be encrypted.

A list of authorized controllers 40 may be received by a secure message, compiled through previous authenticated installations as disclosed herein, or by another method such as programming during manufacture of the module.

In some embodiments of programmed states, only pack controllers 40 that are identified on a specific authorized list, or have specific authorization attributes recorded in the list, may command transitions to another state. In such states commands from pack controllers not identified on the list are disregarded.

In some embodiments of programmed states, pack controllers that are not on an authorized pack controller list may be enabled to issue state transition commands to specific other states without requiring authentication. The illustrated LOCKED state is an example of such a restricted state wherein the transition to the CHARGING state may be commanded by unauthorized or restricted pack controllers, but the transition to the UNLOCKED state may only be commanded by an authorized pack controller. This is useful when communications links necessary for authentication are not available.

In passive states, the receipt of a command message by the module controller 900 via control bus port 700 triggers the processing of the message by the controller and a corresponding response. This functionality is indicated in the diagram of FIG. 4 by the COMM: RESPOND legend. In some embodiments wake-on-comm functionality may be used to bring the module controller 900 out of a powered down or low power condition upon receipt of a command message. Wake-on-comm functionality is well known in the art of controllers and is not described in detail herein.

In other embodiments low voltage electrical power may be supplied to the module controller 900 via control bus port 700 prior to the receipt of a command message by the controller.

Figure 5:
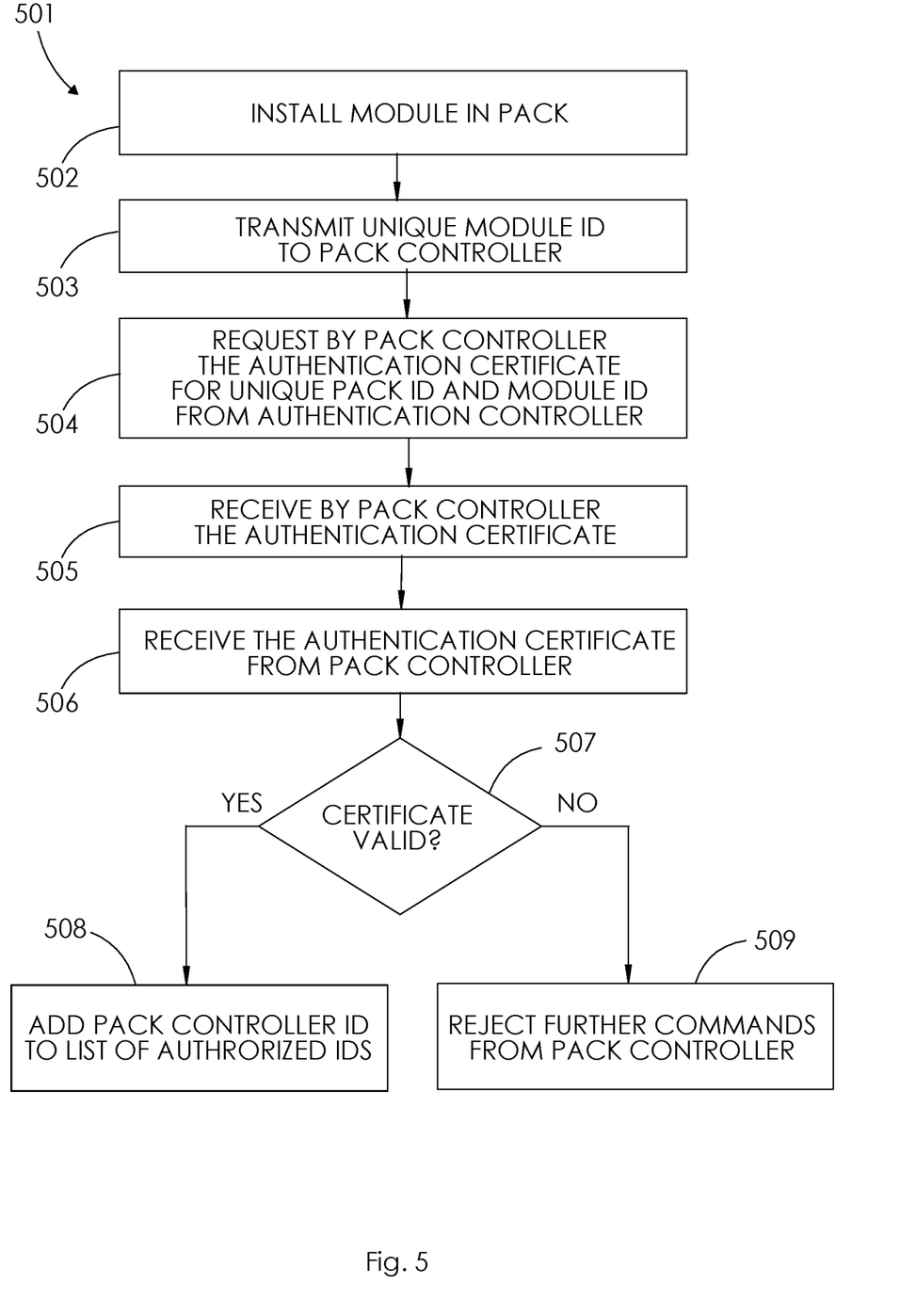
FIG. 5 illustrates the authentication method of the present invention.

A flow chart 501 for a method of authenticating a command source is illustrated in FIG. 5. It should be noted that in some alternative implementations, the functions noted in the blocks may occur out of the order noted in FIG. 5, may include additional functions, and/or may omit some functions. For example, two blocks shown in succession in FIG. 5 may in fact be executed substantially concurrently, the blocks may sometimes be executed in the reverse order, or some of the blocks may not be executed in all instances, depending upon the functionality involved, as will be further clarified hereinbelow. All such modifications and variations are intended to be included herein within the scope of this disclosure.

Upon installation of a module into a pack at block 502, the unique module ID (MIN) is then transmitted to the pack controller at block 503. At block 504, the pack controller 40 requests an authentication certificate from the unique pack ID and module ID from the authentication controller 50. Then, at block 505, the pack controller 40 may then obtain an authentication certificate from the authentication controller, which in some embodiments may be a secure message configured to be readable by the module controller having the specific MIN. As a step in the process of obtaining the authentication certificate, the pack controller may transmit its unique pack ID to the authentication controller, to be included in the authentication certificate. Methods of obtaining such secure messages are well known in the art of secure communications. The authentication certificate may further contain information such as the vehicle ID (VIN) or product ID (PIN) associated with the battery pack in which the module has been installed.

Once obtained, the authentication certificate is communicated by pack controller 40 to the specific module 10 to authenticate the identity of the pack controller 40 to the module controller 900 comprised within the module at block 506, said controller 900 having the unique MIN for which authentication certificate was obtained. At block 507, a determination is made whether the certificate is valid. Once authenticated (the YES condition), the unique ID of the pack controller 40 at block 508 may be added by the module controller 900 to a list of authorized command source IDs, in order that further authentication not be required for commands received from the pack controller having said unique ID. If not authenticated (the NO condition), further commands from the pack controller 40 are rejected at block 509.

A pack controller 40 having a unique ID which has been successfully authenticated and added to a list of authorized command source IDs is referred to as an authorized controller in the descriptions provided herein. A pack controller having a unique ID that has not been successfully authenticated may be added by means of steps further disclosed below, and is referred to as a restricted controller in the descriptions provided herein.

Figure 6:
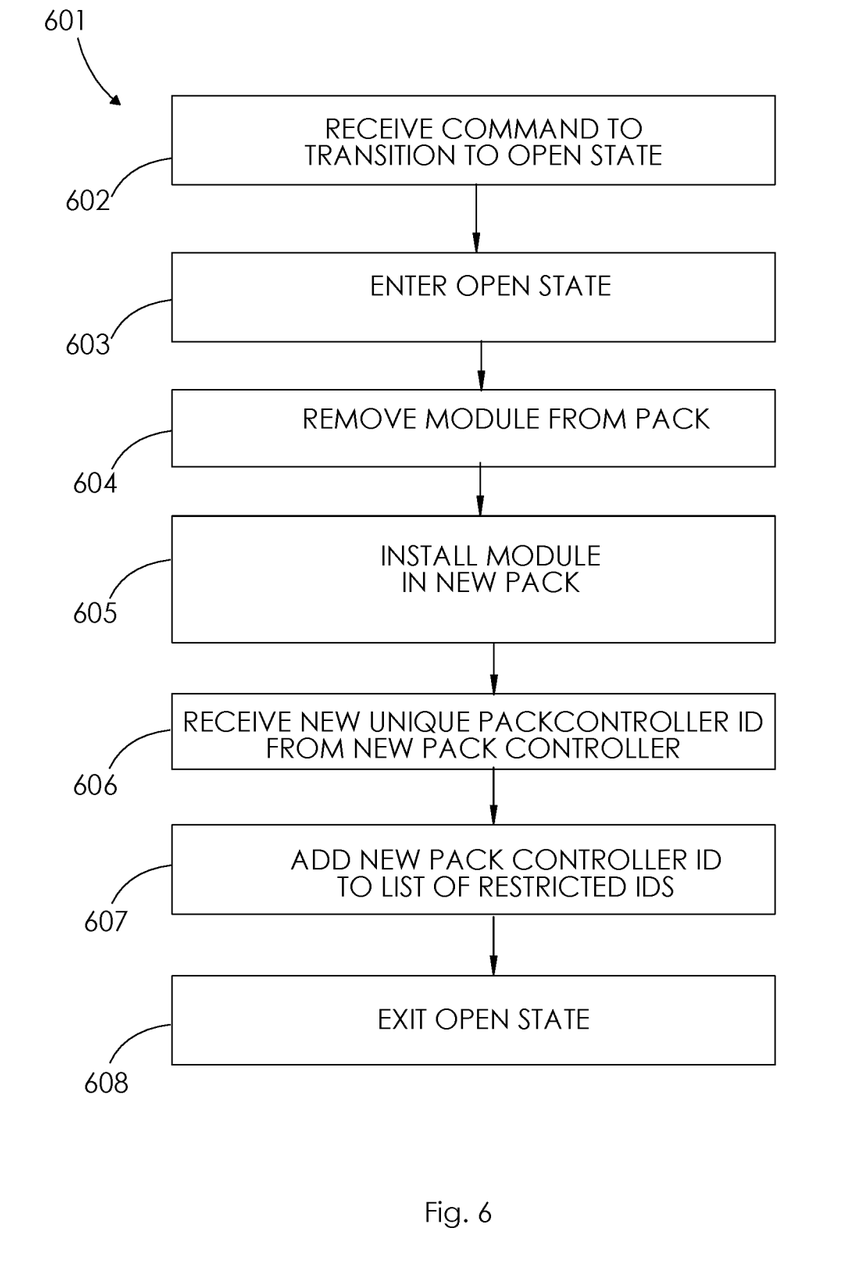
FIG. 6 is a diagram of additional steps of the authentication method.

Further steps of the authentication method are illustrated in the flow chart 601 in FIG. 6. It should be noted that in some alternative implementations, the functions noted in the blocks may occur out of the order noted in FIG. 6, may include additional functions, and/or may omit some functions. For example, two blocks shown in succession in FIG. 6 may in fact be executed substantially concurrently, the blocks may sometimes be executed in the reverse order, or some of the blocks may not be executed in all instances, depending upon the functionality involved, as will be further clarified hereinbelow. All such modifications and variations are intended to be included herein within the scope of this disclosure.

The functions illustrated in the blocks of FIG. 6. facilitate the addition of new pack controllers 40 (FIG. 1), which do not have an available communications link to an authentication controller 50, to a list of restricted pack controllers from which some commands may be accepted without requiring authentication. In some embodiments such a list may be distinct from the list described in block 508 (FIG. 5). In other embodiments the list may be the same list described in block 508, but with additional information pertaining to command restrictions associated with the newly added pack controller ID.

An authorized pack controller 40 may issue a command at block 602 to the module controller 900 to transition the module to a specific static state, herein descriptively referred to as OPEN, in which the next pack controller 40 placed in communication with the module will be added to the list of restricted command source IDs without the requirement to authenticate the identity of the new pack controller, albeit with restrictions on specific commands that the new restricted controller may issue.

After a module transitions to the OPEN state at block 603, it is removed from the authorized pack at block 604 and installed in a new pack at block 605. The unique pack ID is then obtained from the new pack controller 40 at block 606 and added to a list of restricted pack controller IDs at block 607. Upon completion of the above steps, the OPEN state is exited at block 608.

An example of the restrictions that may be associated with a restricted controller is disregarding commands from the newly added pack controller to transition to OPEN state. Such a restriction would ensure that only authorized pack controllers can command a module to transition to the OPEN state. This example is illustrative and not limiting. Other restrictions may be implemented in some embodiments, as appropriate to the embodiment. Some embodiments may further implement different levels of restrictions for different restricted controllers.

In some embodiments, operator input via an operator interface may be further required as part of the authentication process. This input may include selecting options from an on-screen menu, entering a passcode, sensing operator biometrics, and the like. Many such authentication methods and operator interfaces are known, including handheld devices with wireless communications, and are not described in detail herein. The embodiments disclosed herein are illustrative and not limiting; other embodiments shall be readily apparent to those skilled in the art based upon the disclosures made herein, without departing from the scope of the present invention.

An example embodiment authenticates transactions and tracks assets, including physical devices having unique identifier (ID) by means of secure electronic tokens and distributed secure ledgers, collectively and interchangeably referred to herein as blockchain technologies. Blockchain technologies are an embodiment of an Internet database used for storing and accessing information pertaining to devices with unique IDs as disclosed herein. In particular, in accordance with a non-limiting example embodiment, Non Fungible Tokens (NFT) are being adopted in the Ethereum blockchain to track ownership and transactions of a wide variety of objects. NFTs are transacted by means of Smart Contracts (SC). NFTs and SCs are described by standards such as, but not limited to, Ethereum ERC721 and ERC115 and are therefore not described in detail herein except in how such non-limiting example standards relate to the unique apparatus and methods of the present invention.

In embodiments of the system disclosed herein not utilizing blockchain technologies, authorization data may be explicitly stored in a database accessed by the authentication controller, indicating authorization of a specific module 10 to transition to an active state. For example, if a module is reported stolen, authorization data indicating in the negative may be recorded in the database record associated with the module. If proof of control is provided pertaining to a specific battery pack and a specific battery module, authorization data indicating in the affirmative may be entered in database records associated with each device, and a further data association may be made between the respective records.

Non-limiting example embodiments employing blockchain technologies comprise decentralized peer-to-peer transactions and distributed data with multiple secure copies. In such embodiments, SCs govern the transactions of the tokens associated with a blockchain, both fungible and non-fungible. Blockchain technologies are utilized to establish, prove and transfer ownership of all or a part of a token by associating the ownership with a wallet. A wallet is a secure data structure containing records of ownership of tokens, and requiring Access Data, such as an encryption key, to access. Blockchain transactions primarily pertain to verification and transfer of the ownership and require authorization data to complete the transaction.

Authorization data in embodiments employing blockchain technologies is obtained or generated by accessing the token data structure, wallet data structures between which the ownership of all or a part of a token is being transferred, and the secure blockchain ledger. The terms 'ownership' and 'control' as they pertain to blockchain tokens are used interchangeably herein. In the context of the disclosures and claims made herein, authorization data indicates in the affirmative if the SC conditions are met and proof of ownership and intent to transfer are confirmed. If one or more predetermined conditions for the transfer are not met, authorization data is deemed to indicate in the negative.

For objects that are digital tokens and only exist in the blockchain data structures, such as cryptocurrency like Bitcoin, the enforcement of the transactions is inherent in the blockchain protocols. When transactions involve NFTs that are associated with physical objects, only the transactions of the NFTs themselves can be enforced by the blockchain protocols. The blockchain offers no positive control over the transfer of the associated physical objects.

A key unique feature of the battery modules of the present invention and the battery packs comprised thereof is the fact that the control of each battery module's connection to a common power bus rests solely within the battery module, responsive to the computer program algorithm being executed by the module controller 900 (FIG. 2) implementing a plurality of programmed states. A command is issued by the pack controller 40 substantially simultaneously to all module controllers 900 to transition to a programmed state. Each module controller 900 then individually makes an election to accept the command or reject it responsive to monitored conditions and the methods disclosed herein, exercising control over the connection by controlling relays 500 and 600 (FIG. 3). An example of such election is illustrated in block 507 of FIG. 5.

Additional examples of the control being exercised by the module controller 900 over the connection of the corresponding module 10 to the power busses 20 and 30 (FIG. 1) include the controlling at least one of the relays responsive to monitored conditions in active states, and the transitions from active states to inactive states responsive to monitored conditions, as illustrated in FIG. 4 and disclosed herein.

The direct control that each battery module of the present invention has over its connection to a power bus, and consequently its function with respect to transfer of electrical energy, provides the novel utility of the alteration of removable battery module functionality responsive to information securely received from an authentication controller accessing a blockchain database.

Further, the unique IDs and secure message communication between the components of the herein disclosed modular battery system facilitate the delivery, storage and transport of encryption keys, NFT addresses, block addresses and other key data utilized in blockchain technologies. Such data is collectively referred to as Access Data herein. Varying embodiments utilize Access Data to securely access NFTs and blockchain ledgers that securely memorize varying operating states, transactions and data of an identifiable battery module as described herein.

Together the components and methods of the modular battery system taught herein enable the positive control over the use of a module responsive to information comprised in the associated NFT and the associated blockchain ledger of the transactions carried out on the NFT by SCs, as further detailed hereinbelow.

The battery module 10 of the present invention is disclosed herein having two relays 500 and 600 (FIG. 2). It should be understood that the active control of only a first relay 500 (or the second relay 600) of the two relays may be necessary to embody some or all of the system disclosed herein, provided that the second relay is controlled to be in the conductive (enabled) state at all times that the first relay is enabled. Therefore it should be understood that, unless specifically indicated otherwise in the disclosures and claims made herein, in an active state a first relay is controlled by the module controller 900 responsive to monitored conditions and commands, while the second relay may be enabled continuously for as long as the module controller remains in an active programmed state, or be controlled substantially simultaneously, and not distinctly from, the first relay.

In the following disclosures, with reference to the system illustrated in FIG. 1, it should be understood that Authentication components of the battery system are comprised within external authentication controller 50, Pack components of the battery system are comprised within battery pack 5 having pack controller 40 and a plurality of module sockets 25, and Module components of the battery system are comprised within each of modules 10 having module controller 900 (FIG. 2), relays 500 and 600, and a plurality of cells 400. As used herein, the term battery system refers to a system of apparatus comprising all the above listed components, and the corresponding computer programs associated with each of the components, embodying the methods disclosed herein.

Figure 7:
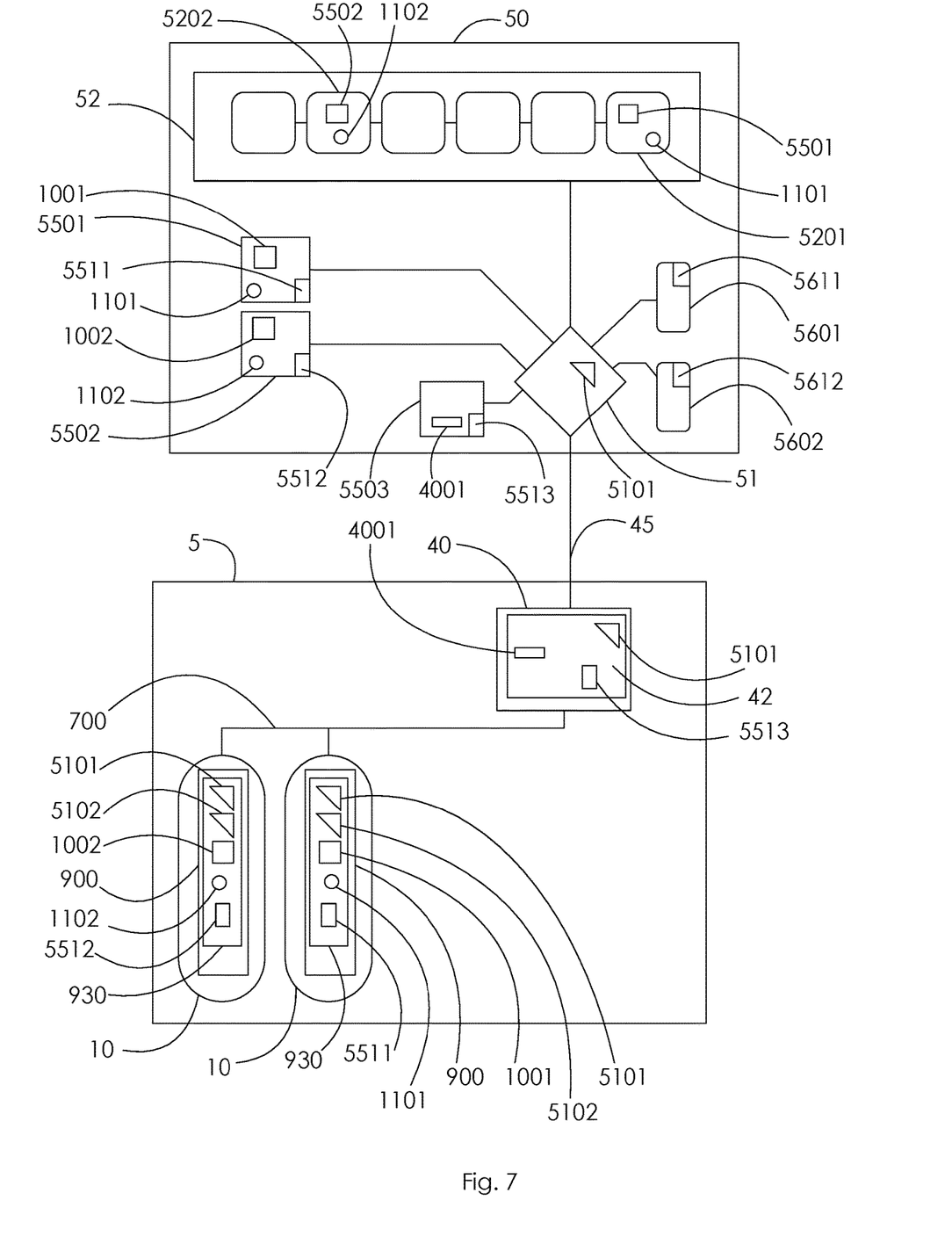
FIG. 7 illustrates an embodiment of the battery system of the present invention with authentication controller utilizing blockchain technology.

An embodiment of the battery system of the present invention utilizing blockchain technologies is further illustrated in FIG. 7. The diagram of FIG. 7 shows an authentication controller 50 and a battery pack 5 being communicatively coupled to authentication controller 50 by means of a communications link 45. In many embodiments the communications link 45 may be an Internet connection, and may employ any encryption protocols known in the arts of computer communications. In other embodiments the communications link 45 may be by means of a private network. In some embodiments the communications link may be via a satellite, WiFi, a cellular telephony system, or the like. It should be understood that communications link 45 may not be permanent and may be established as appropriate at various times by various known means.

The illustrated authentication controller 50 is shown comprising an access processor 51 having a unique access identifier 5101, which in many embodiments may be a Universal Resource Locator (URL), and shall be referred to as URL 5101 for brevity herein. It should be understood that any other form of unique ID, such as a number or an alphanumeric string, may be used without departing from the scope of the invention. The authentication controller 50 is further diagrammatically illustrated comprising a database 52 accessible by the access processor 51 which in the non-limiting illustrated embodiment comprises a blockchain ledger further comprising a plurality of chained data blocks, each block further comprising a plurality of transaction records (not illustrated for brevity). In the following descriptions and claims, disclosures of an authentication controller accessing a database interchangeably refer to the access processor 51 associated with the authentication controller 50 accessing the database 52 associated with the authentication controller. In some embodiments, accessing a database may refer solely to reading of data recorded in the database. In other embodiments, accessing a database refers to both reading and writing of records in the database, and may include securely writing blockchain data blocks in accordance with the methods practiced in the arts of blockchain technologies.

Illustrative instances of data blocks 5201 and 5202 are shown, comprising data referencing NFT identifiers 5501 and 5502, respectively. Any data block may reference any number of NFT identifiers. It should be understood that embodiments of database 52, including those which do not utilize blockchain technologies, may be hosted on multiple network-connected servers which may be geographically distributed, and may comprise multiple copies of the data that are substantially identical.

Two illustrative instances of wallet data structures are shown with numerals 5601 and 5602, having the corresponding wallet addresses 5611 and 5612.

Specific NFT instances uniquely associated with the illustrated instances of modules 10 are shown as 5501 and 5502, corresponding respectively to the module instances having unique module IDs 1001 and 1002. Each NFT is diagrammatically shown having a uniquely associated Access Data 5511 and 5512, respectively. Each NFT further comprises data referencing the uniquely associated module ID.

Ownership or control of NFTs is securely associated with one or more wallet instances. Transactions pertaining to such associations are recorded in the blockchain ledger 52.

An NFT instance 5503 uniquely associated with the illustrated instance of battery pack 5 having the pack controller unique ID 4001 is further illustrated, having unique Access Data 5513.

In many embodiments, a plurality of substantially identical copies of authentication controller 50 may exist, distributed over a plurality of computer servers, being accessed through a single URL 5101. Such embodiments may employ distributed copies, including copies that are geographically distributed.

Some embodiments may utilize separate and distinct authentication controllers 50, each having a unique identifier, to authenticate transitions of a module controller 900 between certain programmed states or certain types of programmed states.

An NFT identifier is a unique number assigned when the NFT is created. Some embodiments, wherein the NFT is created prior to or substantially simultaneously with the manufacture of the corresponding module 10, may utilize the NFT identifier as the unique module ID, while others may utilize distinct identifiers for the NFT and the associated module 10, storing both identifiers in the nonvolatile memory 930 (FIG. 7) of the associated module controller 900. A non-limiting example embodiment stores identifiers in nonvolatile memory 930 of a module controller 900. Similarly, a non-limiting embodiment stores unique identifiers and corresponding Access Data in nonvolatile memory 42 of a pack controller 40 (FIG. 7). Nonvolatile memory may be of reprogrammable or one time programmable type. It should be understood that in the disclosures made herein, a reference to an identifier or other data, including data comprising an executable program, being stored or comprised in a controller, or a controller having a unique ID or data, indicates the referenced data being stored in the nonvolatile memory of the controller unless specifically noted otherwise.

NFT embodiments known in the arts of blockchain technologies may incorporate metadata, which is data that is descriptive of or pertinent to the object associated with the NFT. In the illustrated embodiment, metadata 1101 and 1102, associated with modules 10 having unique IDs 1001 and 1002, respectively, may represent battery module status, module usage history, and the like. In particular, a battery module may keep a record of the electrical energy being transferred to and from the battery module by monitoring the voltage and the current (monitored conditions) over time. Collectively, all such data is referred to as Module History Data herein. In accordance with the arts of blockchain technologies, metadata may be stored on chain by incorporating the data in the secure data structures and records of the chain, or off chain wherein the NFT only contains a reference, such as a URL, to where the data may be accessed, and the Access Data necessary for doing so.

Embodiments may store Module History Data on chain, off chain, or both without departing from the scope of the invention. The storing of Module History Data in the memory of the module controller 900 is an embodiment of off chain metadata storage. In embodiments wherein some or all of the Module History Data is also stored securely on chain, a comparison of the two copies of the data may provide a further authentication step.

The illustrated instance of battery pack 5 is shown having a pack controller 40 further comprising the unique ID 4001, the URL 5101 of the authentication controller 50, and the access data 5513 of the NFT 5503 that is associated with the pack.

The pack 5 further comprises a plurality of modules 10, each having a module controller 900. Two unique instances of modules 10 are illustrated, having unique IDs 1001 and 1002 comprised in the respective controllers 900. Any number of modules 10 may be added to or removed from pack 5 at any time in accordance with the methods disclosed herein. Two instances are illustrated for brevity. The illustrations of FIG. 7 are not numerically limiting.

The controllers 900 of the illustrated modules 10 each further comprise the associated URL 5101 of the authentication controller 50 and the respective Access Data 5511 and 5512 of the corresponding NFTs 5501 and 5502. In some embodiments the memory of a controller 900 of a module 10 may contain a plurality of distinct URLs (illustrated by the numeral 5102) and the corresponding Access Data, each associated with a distinct authentication controller 50. In such embodiments, specific and distinct authentication controllers may be accessed for authenticating the transition between specific programmed states or specific types of programmed states. The full details of a plurality of authentications controllers and the corresponding data structures are not illustrated for brevity.

It should be emphasized that the above-described embodiments of the methods and apparatus of the present invention are merely possible examples of implementations of the invention. Many variations and modifications may be made to the above-described embodiments. All such modifications and variations are intended to be included herein within the scope of this disclosure and protected by the following claims.

Furthermore, the disclosure above encompasses multiple distinct inventions with independent utility. While each of these inventions has been disclosed in a particular form, the specific embodiments disclosed and illustrated above are not to be considered in a limiting sense as numerous variations are possible. The subject matter of the inventions includes all novel and non-obvious combinations and subcombinations of the various elements, features, functions and/or properties disclosed above and inherent to those skilled in the art pertaining to such inventions. Where the disclosure or subsequently filed claims recite "a" element, "a first" element, or any such equivalent term, the disclosure or claims should be understood to incorporate one or more such elements, neither requiring nor excluding two or more such elements.

Applicant(s) reserves the right to submit claims directed to combinations and subcombinations of the disclosed inventions that are believed to be novel and non-obvious. Inventions embodied in other combinations and subcombinations of features, functions, elements and/or properties may be claimed through amendment of those claims or presentation of new claims in the present application or in a related application. Such amended or new claims, whether they are directed to the same invention or a different invention and whether they are different, broader, narrower, or equal in scope to the original claims, are to be considered within the subject matter of the inventions described herein.

Therefore, having thus described the invention, at least the following is claimed:

1. A system comprising:
   an authentication controller having an authentication controller unique ID, said authentication controller comprising an access controller, said access controller being configured to access a database, said database comprising authorization data associated with a plurality of pack controller unique IDs, said database further comprising authorization data associated with a plurality of battery module controller unique IDs;
   a modular battery pack comprising:
      a plurality of sockets to receive a plurality of removable battery modules;
      a pack controller having a unique ID, said pack controller being configured to communicate with the authentication controller, said pack controller being further configured to communicate with at least a first of the plurality of removable battery modules received in a first of the plurality of sockets, said pack controller having a memory containing:
         said pack controller unique ID,
         at least said authentication controller unique ID, and
         a pack controller executable program;
      a control bus for communicatively coupling said pack controller and the first removable battery module received in said first of the plurality of sockets;
   a communications link for communicatively coupling said authentication controller and said pack controller;
   wherein the first removable battery module further comprises:
      an enclosure;
      a positive terminal;
      a negative terminal;
      a plurality of battery cells contained within said enclosure, said plurality of battery cells being electrically isolated from said enclosure, and being further electrically isolated from one of said positive terminal and said negative terminal;
      a control bus port;
      a module controller having a unique ID, said module controller being communicatively coupled to said control bus port, said module controller having a memory comprising:
         said module controller unique ID,
         at least said authentication controller unique ID,
         a list of authorized pack controller unique IDs,
         a module controller executable program;
      a relay being electrically coupled to said plurality of battery cells, and being further electrically coupled said one of said positive terminal and said negative terminal, said relay being controllably coupled to said module controller;
   wherein the execution of said pack controller executable program causes the pack controller to:
      transmit via the control bus a command to the module controller to transition to an active state, said command containing the unique ID of the pack controller;
      responsive to receiving via the control bus an authentication request from the module controller, said authentication request containing at least the module controller unique ID, transmit via the communications link an authentication certificate request to the authentication controller, said authentication certificate request containing at least the pack controller unique ID and the module controller unique ID;
      responsive to receiving via the communications link an authentication certificate from the authentication controller, said authentication certificate containing authorization data associated with each of the pack controller unique ID and the module controller unique ID, said authorization data being retrieved by the authentication controller from the database, transmit via the control bus the received authentication certificate to the module controller;
   wherein the execution of said module controller executable program causes the module controller to:
      receive via the control bus the command from the pack controller to transition to the active state, said command containing the pack controller unique ID;
      responsive to said pack controller unique ID not being on the list of authorized pack controller unique IDs, transmit via the control bus to the pack controller the authentication request, said authentication request containing the module controller unique ID;
      responsive to receiving via the control bus from the pack controller the authentication certificate, check validity of the received authentication certificate, and responsive to the authentication certificate being valid add the pack controller unique ID to the list of authorized pack controller unique IDs;

responsive to the pack controller unique ID contained in the received command being on the list of authorized pack controller unique IDs, transition to the active state;

responsive to being in the active state, control the relay to electrically connect said plurality of cells to said one of said positive terminal and said negative terminal; and wherein the receipt via the communications link of the authentication certificate request by the authentication controller, said authentication request containing at least the pack controller unique ID and the module controller unique ID, causes the authentication controller to:

access the database to retrieve the authorization data associated with the pack controller unique ID;

access the database to retrieve the authorization data associated with the module controller unique ID;

check the retrieved authorization data for indication of authorization to issue the authentication certificate for said pack controller unique ID and said module controller unique ID; and responsive to the authorization data indicating in the affirmative, generate a valid authentication certificate and transmit the valid authentication certificate via the communications link to the pack controller.

2. The system of claim 1, wherein said communications link is an Internet connection.

3. The system of claim 1, wherein the communication between the authentication controller and the pack controller via said communications link is by means of a secure message.

4. The system of claim 1, wherein the communication between the pack controller and the module controller via said control bus is by means of a secure message.

5. The system of claim 1, wherein:

said database accessed by the authentication controller comprises a blockchain of records that is secure, said authorization data associated with the pack controller unique ID is comprised in a first Non Fungible Token (NFT), said first NFT being associated with the pack controller unique ID, said authorization data associated with the module controller unique ID is comprised in a second Non Fungible Token (NFT), said second NFT being associated with the module controller unique ID, said memory of the pack controller further comprises first Access Data for said first NFT, said memory of the module controller further comprises second Access Data for said second NFT, said authentication request further contains said second Access Data for said second NFT, said authentication certificate request further contains said first Access Data for said first NFT and said second Access Data for said second NFT, and wherein the authentication controller is caused to retrieve said authorization data associated with said pack controller unique ID from said first NFT, and to retrieve said authorization data associated with said module controller unique ID from said second NFT.

6. The system of claim 5, wherein the authentication controller is further caused to record the generation of the valid authentication certificate in said blockchain of records.

7. The system of claim 6, said module controller memory further comprising Module History Data, said authentication request further containing said Module History Data, said authentication certificate request further containing said Module History Data, and wherein the authentication controller is further caused to record said Module History Data in said blockchain of records.

8. The system of claim 6, said module controller memory further comprising Module History Data, said authentication request further containing said Module History Data, said authentication certificate request further containing said Module History Data, and wherein the authentication controller is further caused to record said Module History Data in said second NFT.

9. The system of claim 2 wherein said Internet connection is established by the pack controller responsive to receiving via the control bus the authentication request from the module controller.

10. A pack controller for modular battery packs, said modular battery pack comprising:

a plurality of sockets wherein each one of the plurality of sockets is configured to receive one of a plurality of battery modules that are removable from the socket, each of said plurality of battery modules further comprising a module controller, each of said plurality of battery modules further comprising a control bus port, said control bus port being communicatively coupled to the module controller;

a control bus for communicatively coupling the pack controller and the control bus port of a first battery module received in a first of the plurality of sockets; and a communications link for communicatively coupling the pack controller to an authentication controller, said pack controller having a unique ID, said pack controller being configured to communicate via the communications link with an authentication controller, said authentication controller having an authentication controller unique ID, said pack controller being further configured to communicate via the control bus with at least a module controller of the first battery module received in the first of the plurality of sockets, said pack controller having a memory containing:

said pack controller unique ID, at least the authentication controller unique ID, and a pack controller executable program;

wherein the execution of said pack controller executable program causes the pack controller to:

transmit via the control bus a command to the module controller to transition to an active state, said command containing the pack controller unique ID;

responsive to receiving via the control bus an authentication request from the module controller, said request containing at least a module controller unique ID associated with the module controller, transmit via the communications link an authentication certificate request to the authentication controller, said request containing at least the pack controller unique ID and the module controller unique ID; and responsive to receiving via the communications link an authentication certificate from the authentication controller, said authentication certificate containing authorization data associated with each of the pack controller unique ID and the module controller unique ID, said authorization data being retrieved by the authentication controller from a database accessed by the authentication controller, transmit via the control bus the received authentication certificate to the module controller.

11. The controller of claim 10 wherein:
said database accessed by the authentication controller comprises a blockchain of records that is secure,
said authorization data associated with the pack controller unique ID is comprised in a first Non Fungible Token (NFT), said first NFT being associated with the pack controller unique ID,
said authorization data associated with the module controller unique ID is comprised in a second Non Fungible Token (NFT), said second NFT being associated with the module controller unique ID,
said memory of the pack controller further comprises first Access Data for said first NFT,
said authentication request further contains second Access Data for said second NFT, and
said authentication certificate request further contains said first Access Data for said first NFT and said second Access Data for said second NFT.

12. A module controller for battery modules, said module comprising:
an enclosure;
a positive terminal;
a negative terminal;
a plurality of battery cells contained within said enclosure, said plurality of battery cells being electrically isolated from said enclosure, and being further electrically isolated from one of said positive terminal and said negative terminal;
a control bus port;
a relay being electrically coupled to said plurality of battery cells, and being further electrically coupled said one of said positive terminal and said negative terminal, said relay being controllably coupled to said module controller;
said module controller having a module controller unique ID,
said module controller being communicatively coupled to said control bus port,
said module controller having a memory comprising:
said module controller unique ID,
at least an authentication controller unique ID,
a list of authorized pack controller unique IDs, and
a module controller executable program;
wherein the execution of said module controller executable program causes the module controller to:
receive via the control bus a command to transition to an active state, said command containing a pack controller unique ID;
responsive to said pack controller unique ID not being on the list of authorized pack controller unique IDs, transmit via the control bus an authentication request, said authentication request containing the module controller unique ID;
responsive to receiving via the control bus an authentication certificate, check validity of the received authentication certificate, and responsive to the certificate being valid add the pack controller unique ID to the list of authorized pack controller unique IDs;
responsive to the pack controller unique ID contained in the received command being on the list of authorized pack controller unique IDs, transition to the active state; and
responsive to being in the active state, control the relay to electrically connect said plurality of cells to said one of said positive terminal and said negative terminal.

13. The controller of claim 12 wherein:
said authentication controller unique ID is associated with an authentication controller, said authentication controller being configured to access a database, said database comprising a blockchain of records that is secure,
said memory of the module controller further comprises Access Data for at least a NFT,
said authentication request further contains said Access Data for said NFT.

* * * * *